United States Patent
Oppenheimer et al.

(10) Patent No.: US 7,734,406 B1
(45) Date of Patent: Jun. 8, 2010

(54) INTEGRATED CONTROL OF BRAKE AND STEER BY WIRE SYSTEM USING OPTIMAL CONTROL ALLOCATION METHODS

(75) Inventors: Michael W. Oppenheimer, Beavercreek, OH (US); David B. Doman, Springfield, OH (US); Aleksander B. Hac, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 571 days.

(21) Appl. No.: 11/489,811

(22) Filed: Jul. 10, 2006

(51) Int. Cl.
*G06F 19/00* (2006.01)

(52) U.S. Cl. .............................. 701/70; 701/41; 701/71; 303/122; 303/140; 303/146; 303/149; 303/150; 180/197; 180/443; 180/444; 180/445

(58) Field of Classification Search .................... 701/1, 701/41, 70, 72–81; 303/122, 122.02, 122.03, 303/140, 146–150; 180/444, 445
See application file for complete search history.

(56) References Cited

U.S. PATENT DOCUMENTS 5,668,724 A * 9/1997 Ehret et al. .................... 701/80
5,931,887 A 8/1999 Hac
6,412,885 B1 * 7/2002 Shirai et al. ............. 303/122.09
6,535,806 B2 3/2003 Millsap et al.
6,549,842 B1 * 4/2003 Hac et al. ....................... 701/80
6,598,695 B1 7/2003 Menjak et al.
6,922,617 B2 * 7/2005 Kogure et al. .................. 701/1
2004/0128044 A1 * 7/2004 Hac ............................ 701/48
2005/0057095 A1 * 3/2005 Hac ............................ 303/122

* cited by examiner

*Primary Examiner*—Tuan C To
*Assistant Examiner*—Redhwan Mawari
(74) *Attorney, Agent, or Firm*—AFMCLO/JAZ; Gerald B. Hollins; Daniel J. Krieger

(57) ABSTRACT

A method, computer usable medium including a program, and a system for braking a vehicle during brake failure. The method and computer usable medium include the steps of determining a brake force lost corresponding to a failed brake, and determining a brake force reserve corresponding to at least one non-failed brake. At least one commanded brake force is determined based on the brake force lost and the brake force reserve. Then at least one command brake force is applied to the at least one non-failed brake wherein at least one of an undesired yaw moment and a yaw moment rate of change are limited to predetermined values. The system includes a plurality of brake assemblies wherein a commanded brake force is applied to at least one non-failed brake.

11 Claims, 4 Drawing Sheets

US 7,734,406 B1

INTEGRATED CONTROL OF BRAKE AND STEER BY WIRE SYSTEM USING OPTIMAL CONTROL ALLOCATION METHODS

RIGHTS OF THE GOVERNMENT

The invention described herein may be manufactured and used by or for the Government of the United States for all governmental purposes without the payment of any royalty.

FIELD OF THE INVENTION

The present invention relates generally to steering and brake systems. More particularly, the invention relates to strategies for braking a vehicle during brake failure.

BACKGROUND OF THE INVENTION

This document describes a new control strategy for dealing with failure of brake actuators in vehicles equipped with brake-by-wire systems and possibly with steer-by-wire systems. Brake-by-wire systems refer to any brake system in which brake actuators at each wheel can be controlled independently of the driver input and of each other. Steer-by-wire systems are steering systems in which the front (or rear) steering angle can be controlled independently of the driver, providing means of imparting a steer angle correction when necessary.

Algorithms for failure detection and identification in brake by wire systems have been developed. These algorithms either rely on sensor redundancy or use model-based techniques to detect and specify failure modes. It is therefore assumed in this document that when a failure occurs, it is sensed and reported to the control system. The main objective of the control algorithm during the failure mode is to redistribute the control tasks to the functioning actuators, so that the vehicle performance remains as close as possible to the desired performance despite the failure. This invention provides a means of accomplishing this task in an optimal way under all operating conditions.

During normal braking without failures, brake force distribution among four wheels is typically symmetric with respect to the longitudinal axis of vehicle symmetry. When one of the brake actuators fails it does not generate the desired force. This has two undesirable effects on vehicle dynamics: 1) vehicle deceleration is less than desired since the total braking force acting on the vehicle is reduced; and 2) brake force distribution becomes asymmetric, pulling the vehicle to the side as a result of unbalanced yaw moment acting on the vehicle. In order to maintain the desired level of deceleration, while minimizing the unbalanced yaw moment, the brake force distribution among the remaining three wheels must be modified. If the vehicle is equipped with steer by wire, an automatic steering correction may be generated in order to balance at least part of the yaw moment generated by asymmetric braking. The solution to this control allocation problem generally depends on the operating point of the vehicle, and the desired motion of the vehicle.

Consequently, a significant need exists for improving braking control after a failure of a brake-by-wire braking actuator.

SUMMARY OF THE INVENTION

The present invention addresses these and other problems of the prior art by providing an apparatus and method of optimizing drive-by-wire vehicles as a control allocation problem, in which an optimal solution can quickly be determined in real time using linear programming techniques. The apparatus and method comprise: (1) determining the desired motion of vehicle in the yaw plane using driver steering and brake inputs; (2) accessing a stored model that correctly describes the vehicle dynamics in the yaw plane in all operating conditions and poses a structure, which facilitates the numerical solution to the control allocation problem; and (3) numerically solving the optimal control allocation problem quickly, with reference to control input, to minimize the difference between the desired and actual vehicle motion under all constraints placed on actuators.

These and other objects and advantages of the present invention will be made apparent from the accompanying drawings and the description thereof.

BRIEF DESCRIPTION OF THE DRAWINGS

While the specification concludes with claims particularly pointing out and distinctly claiming the present invention, it is believed the same will be better understood by reference to the following description, taken in conjunction with the accompanying drawings in which:

FIG. 4A depicting vehicle deceleration as desired and as contrasted with a reconfiguration control algorithm on or off; FIG. 4B depicting lateral path deviation for the reconfigurable control algorithm on or off; FIG. 4C depicting stopping distance for the reconfigurable control algorithm on and off; and FIG. 4D depicting yaw rate for the reconfigurable control algorithm on and off; FIG. 5A depicting vehicle deceleration as desired and contrasted with BBW and SBW systems, FIG. 5B depicting lateral path deviation for the BBW and SBW systems; FIG. 5C depicting stopping distance for the BBW and SBW systems; and FIG. 5D depicting yaw rate for the BBW and SBW systems.

DETAILED DESCRIPTION OF THE INVENTION

Figure 1:
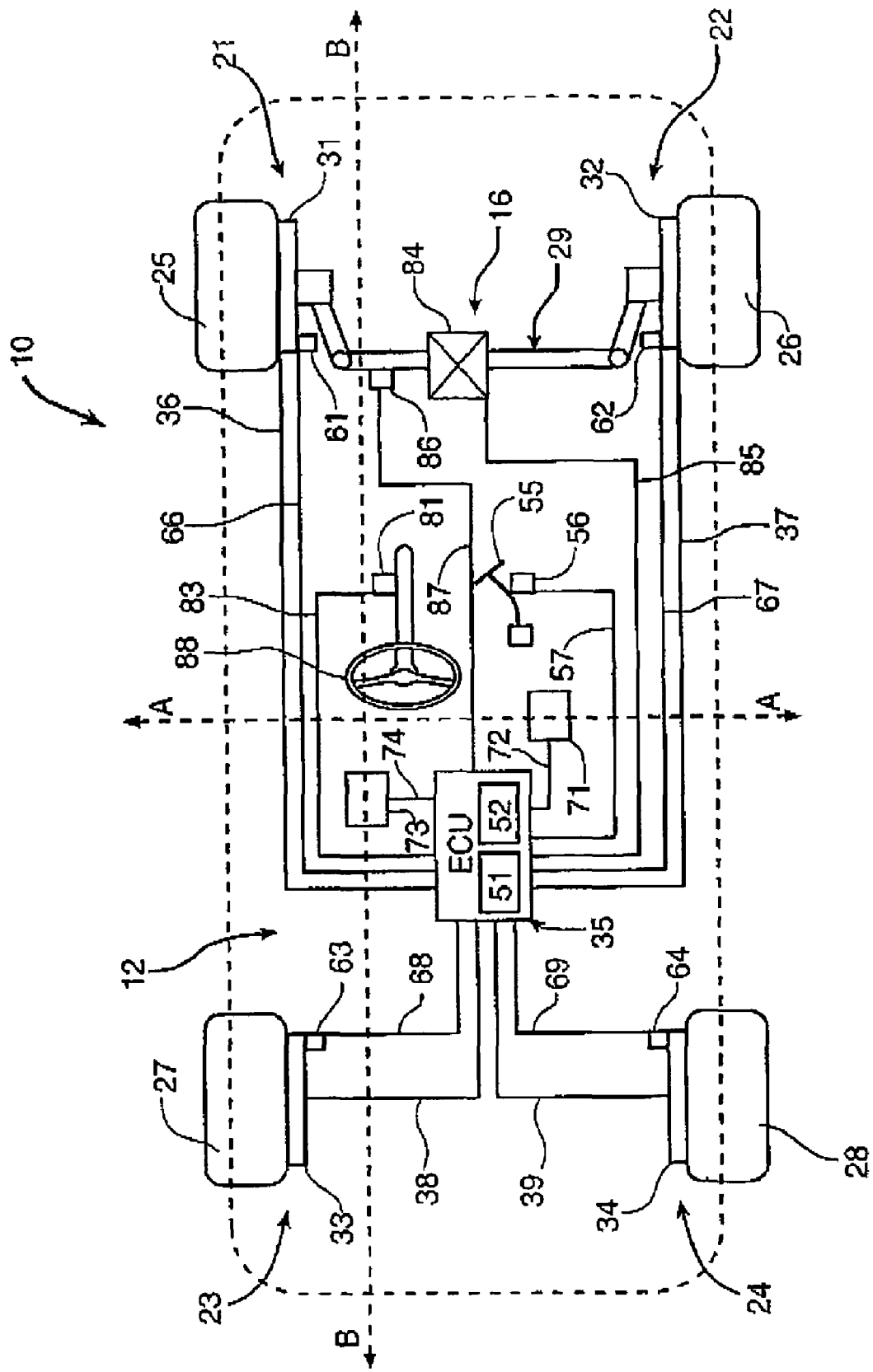
FIG. 1 is a schematic view of a vehicle including a vehicle brake system in accordance with the present invention.

Referring to the drawings, wherein like reference numerals refer to like elements, FIG. 1 is a schematic view of a vehicle, shown generally by numeral 10, with a vehicle brake system 12 in accordance with the present invention. Those skilled in the art will recognize that the vehicle 10 and vehicle brake system 12 may include a number of alternative designs and may be employed in a variety of applications. For example, as will be described, the vehicle 10 may include various sensor (s), active brake-by-wire (BBW) and steer-by-wire (SBW) systems as part of different embodiments of the vehicle brake system 12.

In the present description and figures, the vehicle 10 and the vehicle brake system 12 include both a BBW system 14 and a SBW system 16 for selectively inhibiting wheel rotation during brake failure while limiting an undesired yaw moment to an acceptable level. In portions of the following description, the SBW system 16 may be omitted to provide a vehicle including only a BBW system 14.

Vehicle 10 may include four brake assemblies, in this case, a left front (LF) 21, a right front (RF) 22, a left rear (LR) 23, and a right rear (RR) brake assembly 24. Each brake assembly 21, 22, 23, 24 may include LF, RF, LR, RR wheels 25, 26, 27, 28 coupled to a suspension (not shown) with the steered wheels further coupled to a steering actuator 84, as for example, via a steer rack 29 or other mechanical linkage.

Brake assemblies 21, 22, 23, 24 may each include braking means, such as an LF, RF, LR, RR conventional disc brake systems 31, 32, 33, 34. The brake systems 31, 32, 33, 34 may each include a disc brake and a hub (not shown), which provides a mounting for the wheels 25, 26, 27, 28. The hub may be mounted (e.g., on a suspension link of the vehicle) for rotation about a central axis of the hub. The disc brake may include a disc which is fixedly mounted on the hub for rotation therewith. The brake systems 31, 32, 33, 34 each include a brake actuating device with, for example, friction material pads arranged on opposite sides of a wheel disc. The pads are urged into frictional engagement with the disc to brake the hub and hence the wheels 25, 26, 27, 28.

In one embodiment of the invention, the brake systems 31, 32, 33, 34 may be coupled to an electronic control unit (ECU) 35 by a variety of means known in the art, such as a radio frequency transmission or by a respective coupled wire 36, 37, 38, 39, as shown, to actuate and selectively control braking. The ECU 35 controlled brake systems 31, 32, 33, 34 may optionally provide antilock braking and/or other "advanced" braking functions.

Operation of the brake systems 31, 32, 33, 34 may involve an operator depressing a brake pedal 55 which is sensed by one or more brake pedal force sensor(s) 56 as is known in the art. The force sensor 56 may relay a signal indicative of the brake pedal force to the ECU 35 via a coupled link 57. Subsequently, the ECU 35 may determine an appropriate brake response and relay a signal via the coupled wire 36, 37, 38, 39 for actuating the brake systems 31, 32, 33, 34. Braking by the vehicle 10 may then be achieved by forcing the pads into frictional engagement with their respective discs. As such, a braking force is applied at the wheel assembly 21, 22, 23, 24 discs thereby effectively braking the vehicle 10. Electro-motors may be used to bias the pads against the disc to automatically actuate braking at the wheel assemblies 21, 22, 23, 24. Those skilled in the art will recognize that numerous other brake system types and arrangements may be adapted for use with the present invention. For example, the vehicle 10 may include drum brakes, other disc brake system arrangements, and/or a variety of (electro-) hydraulic and (electro-) mechanical brake actuators.

Each wheel assembly 21, 22, 23, 24 may include a respective wheel speed sensor 61, 62, 63, 64 that provides an output signal, represented respectively by line 66, 67, 68, 69 indicative of the rotational speed of the corresponding wheel 25, 26, 27, 28 at that corner of the vehicle 10. Each wheel speed sensor 61, 62, 63, 64 may further include an internal circuit board with a buffer circuit (not shown) for buffering the output signal, which may be provided to the ECU 35. Output signals 66, 67, 68, 69 may also be relayed to the ECU 35 by a variety of means known in the art, such as a radio frequency transmission or by coupled wire. Suitable wheel speed sensors 61, 62, 63, 64 are known to, and may be constructed by, those skilled in the art. Numerous alternative types of speed, velocity, and acceleration type sensors, including transformer type sensors, may be adapted for use with the present invention.

Vehicle 10 may optionally include one or more lateral acceleration sensor(s) 71 for providing output signals, represented by line 72, indicative of acceleration roughly along axis A. One or more longitudinal acceleration sensor(s) 73 may provide output signals, represented by line 74, indicative of acceleration roughly along axis B. Lateral and longitudinal acceleration sensors 71, 73 may provide their output signals 72, 74 to the ECU 35. Suitable acceleration-type sensors are known to, and may be constructed by, those skilled in the art.

Steer-by-wire (SBW) systems 16 are known to those skilled in the art. Exemplary SBW systems 16 that may be adapted for use with the present invention may include those disclosed by U.S. Pat. No. 6,598,695 issued to Menjak et al. on Jul. 29, 2003 and U.S. Pat. No. 6,535,806 issued to Millsap et al. on Mar. 18, 2003; these patents are hereby incorporated by reference herein. Mechanical steering systems typically include a mechanical linkage or a mechanical connection between the steering wheel and wheel. Movement of such mechanical systems is often power assisted through the use of hydraulic assists of electric motors. SBW systems 16, however, to varying extents replace, for example, the mechanical linkage between the steering wheel and the vehicle wheels with an electrically assisted actuator, which may receive controlling input from a controller (e.g., the ECU 35).

In one embodiment, the SBW system 16 may be an active front steer (AFS) system as known to those skilled in the art. The SBW system 16 may include one or more steering angle sensor(s) 81 for measuring a turn angle of a steering wheel 88. Steering angle sensor 81 may provide output signals, represented by line 83, to the ECU 35. One or more steering actuators 84 may receive input signals, represented by line 85, from the ECU 35 for controlling the steering angle of the wheels 25, 26. The input signals 85 may include both vehicle operator steering input from the steering wheel 88 as well as steering input correction(s) provided by the algorithm of the present invention during brake failure. The steering angle of the wheels 25, 26 may be sensed by one or more sensors 86 and the resulting signal, represented by line 87, sent to the ECU 35. Those skilled in the art will recognize that numerous SBW systems 16 may be adapted for use with the present invention including, but not limited to, two-and four-wheel SBW systems. For example, the vehicle 10 may additionally include an active rear steer (ARS) system.

In one embodiment, the ECU 35 may include a digital microprocessor 51 programmed to process a plurality of input signals in a stored algorithm and generate output signals modulating the braking force at the wheel assemblies 21, 22, 23, 24 and, optionally, controlling the SBW system 16. The methods, algorithms, and determinations (e.g., calculations and estimations), of the presently preferred embodiments, including those based on equations or value tables, may be performed by a device such as the microprocessor 51. The computer usable medium and value tables associated with the presently preferred embodiments may be programmed or read into a memory portion 52 (e.g., ROM, RAM, and the like) thereby allowing the microprocessor 51 to execute a brake control algorithm in accordance with the present invention. Furthermore, the values, parameters, and other numerical data may be stored as required in the memory portion 52. Analog signal processing may be provided for some of the input signals. For example, the signals from the acceleration sensors 71, 73, wheel speed sensors 61, 62, 63, 64, brake pedal force sensor(s) 56, and steering angle sensor 86 may be low-pass filtered through analog low-pass filter(s) to reduce signal noise.

Figure 2:
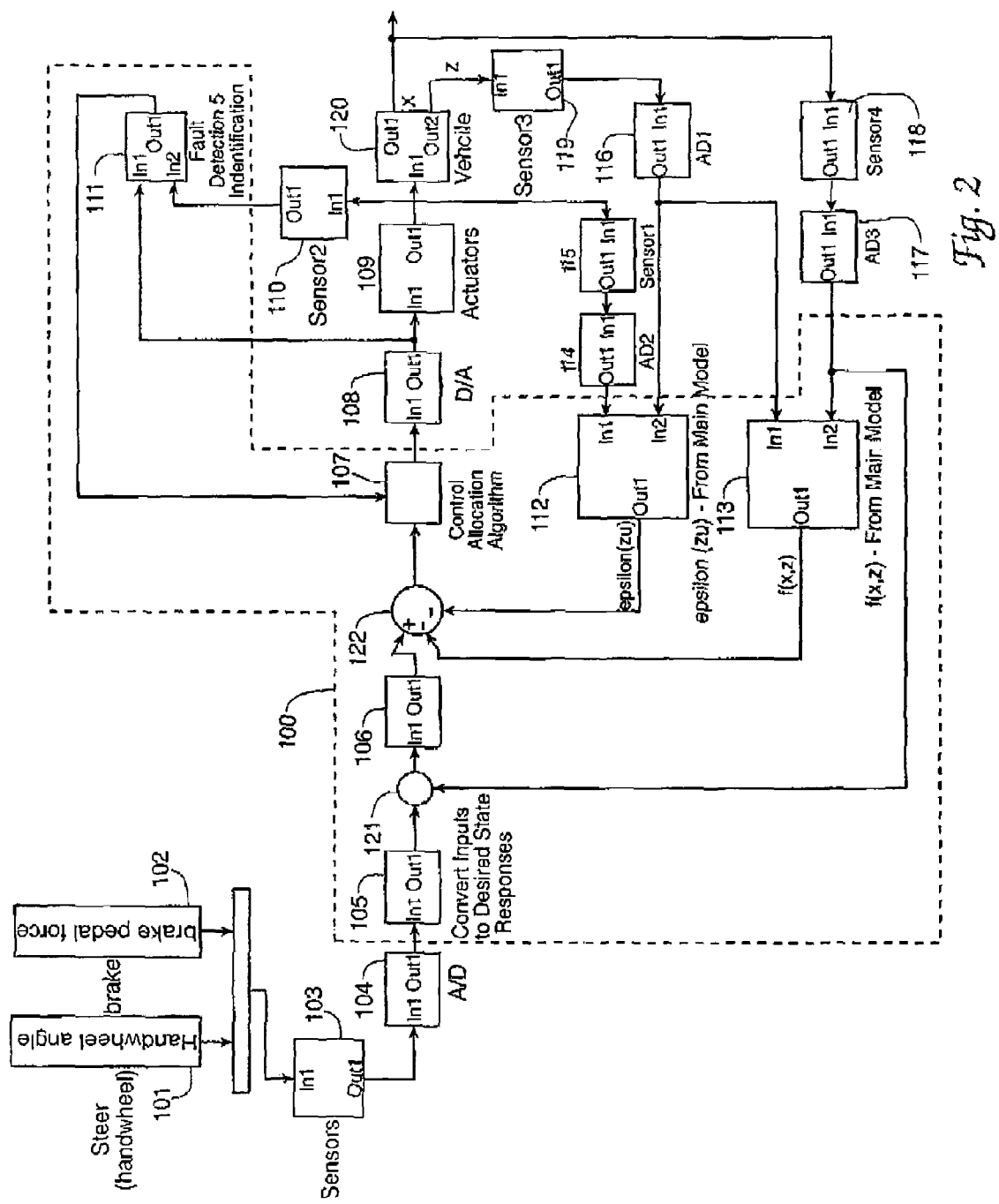
FIG. 2 is a block diagram of the vehicle brake system of the vehicle of FIG. 1.

In FIG. 2, the vehicle brake system 12 is depicted as a data flow block diagram including a braking control algorithm consistent with aspects of the invention depicted at 100 within a dashed line polygon as operating to perform a nonlinear control scheme referred to as feedback linearization or dynamic inversion. A steering handwheel 101 has a current handwheel angle characteristic that is manually set by the driver as an input to the braking control algorithm 100. A brake pedal 102 has a current brake pedal force characteristic that is also set by the driver as an input to the braking control algorithm 100.

Sensors 103 receive the physical characteristics of handwheel angle and brake pedal force as inputs and output signals representing these values. For steering angle, sensor 103 could be an optical encoder or a rotary encoder. For brake pedal forces, sensor 103 may be a pressure transducer mechanically affected by pedal movement. The actual braking force between the tires and the road surface may be sensed or calculated from a related vehicle parameter. For example, a torque sensor in the wheel brake may directly sense braking force. For any such sensed output signals for steering and brake pedal forces that are analog, these output signals are converted by a first set of analog-to-digital converters (A/D) 104, then pass to the algorithm 100 as digital input signals that are then converted by a conversion process at block 105 to a set of desired state variables, that is, velocities and yaw rate. These desired state variables are the "X-DES" variables that the brake system 12 is tasked to track. The converted state variables go to a noninverted input of an outer loop summation block 121 whose output goes into a set of prefilters 106 and is output as a set of desired command variables "X-DOT-DES" signal to an inner loop summation block 122. Prefilters 106 are dynamic elements, which are user defined and shape the dynamic response of the braking system 12.

A control allocation algorithm (block 107), or "control allocator", receives the desired command variables X-DOT-DES and attempts to find a vector of control commands (u) such that $G(z)u=x\text{-dot-}u$ and rate and position limits on the control effectors are taken into account. The output of block 107 is the commanded control vector "u-cmd" that typically passes through a digital-to-analog converter (D/A) 108 to an appropriately scaled analog control input of a respective vehicle actuator 109.

Actual steering angle sensor 110 and actual brake force sensor(s) 115 measure the actual steering angle and brake forces respectively. The output from the latter passes through a second D/A 114. These sensors 110, 115 may directly measure the physical parameter as described for sensors 103 above. Alternatively, a method to determine brake forces is available using measured values of longitudinal and lateral acceleration. For example, consider a vehicle with four independently actuated brakes (RF—right front, RR right rear, LF=left front, and LR=left rear). Tire normal forces for each wheel are calculated using measured longitudinal and lateral accelerations of the vehicle (ax and ay) and known vehicle parameters. Specifically, the normal tire forces are calculated.

The actuators 109 control brake forces and steering angle so that a vehicle 120 performs in a desired manner. These physical results are measured by sensors 118 and converted to a digital signal by a third D/A 117 to measure the state variables (x), namely, longitudinal and lateral velocities and yaw rate and by sensors 119, converted by a first D/A 116 to measure the vector of parameters (z), lateral and longitudinal acceleration and cornering stiffness values. The cornering stiffness values are the functions of tire normal loads and braking forces. The surface friction also affects cornering stiffness. Thus, if the surface coefficient of friction, p, is estimated, it may be used in determining the cornering stiffness values. If it is not available, a value of 1 should be used.

Fault detection and Identification (FDI) process (block 111) of the braking control algorithm 100 is used to determine if an actuator 109 has failed. The command to the actuators 109 from the output of block 108 is compared with the output of the actuators 109 as sensed by the actual steering angle sensor 110. If the difference is larger than a predetermined threshold, then that actuator 109 is declared failed. The FDI block 111 then notifies the control allocation algorithm 107 that an actuator(s) 109 has failed. The control allocation algorithm 107, upon being notified that an actuator 109 has failed, sets the upper and lower position limits of the failed actuator 109 to the failure position. In this way, the effects of the failed actuator 109 are still taken into account in the control allocator 107, but the allocator 107 is aware that the failed actuator 109 is incapable of moving.

An analysis block 112 of the algorithm 100 calculates the control allocation intercept term (Epsilon(z,u)) based on the outputs from blocks 114, 116 for the transformation from a linear control allocator to an affine control allocator. The calculation uses the measured signals for z and u and a mathematical model of the vehicle 120. Another analysis block 113 of the algorithm 100 calculates the vehicle accelerations (f(x,z)) that are produced by everything except the control effectors. Again, a mathematical model of the vehicle 112 and the actual measurements of x and z based on outputs from blocks 116, 117 are used in this calculation.

Since a vehicle moving in the yaw plane has three degrees of freedom: longitudinal motion, lateral motion and rotation about the yaw axis, desired motions in these three directions need to be determined. The desired velocity and deceleration are determined from the brake pedal force and present (estimated) velocity. The desired lateral velocity, lateral acceleration, yaw rate and yaw acceleration are determined from the steering angle and vehicle speed (since vehicle yaw dynamics are speed-dependent).

A good model is instrumental in developing any optimal control algorithm, since on-line optimization is performed under the assumption that the model correctly describes the actual system. Thus the model should accurately describe vehicle dynamics in both linear and non-linear ranges of handling. Parameters of the model should be either constant or depend on directly measured variables, in order to facilitate on-line computations. In the case of re-configurable control algorithms, the structure of the model equation is of great importance. Since the algorithm performs dynamic inversion of the system (that is given the desired response it determines the control input necessary to achieve this response), it is desirable that the equations of motion be of particular structure. Ideally, the equation of the system should be linear in the control input. In the case of vehicle yaw dynamics this has not been accomplished exactly. The state equation of vehicle can be expressed as:

$$dx/dt = f(x,z) + g(z)*u + \epsilon(z,u) \qquad \text{Eq. 1.}$$

where x is a vector of state variables, u a vector of control inputs, and z a vector of parameters or variables, which can be measured. The state vector consists of longitudinal and lateral velocities of vehicle center of gravity and vehicle yaw rate. The control input vector consists of four brake forces at the tires—road interface and the steering input at the front wheels if a steer by wire system is available. The brake forces at the tires can be easily expressed in terms of brake torques or actuating forces, if desired. The last term in equation (1) describes a small nonlinearity.

The control allocation algorithm determines the control input u, which makes the vehicle state vector, x, follow the desired state vector, $x_{des}$, as closely as possible, subject to actuator constraints. Taking into account that the control allocation algorithm operates in discrete-time, the problem of finding the control input at the time instant (k+1) can be found as that of finding the vector of inputs $u_{k+1}$ that satisfies the equation $$[dx_{des}/dt - f(x_k,z_k) - \epsilon(z_k,u_k)] = g(z_k)*u_{k+1} \qquad \text{Eqn. 2}$$

as closely as possible under constraints. Here the subscript k refers to discrete time. Since equation (2) is linear in the control input, $u_{k+1}$, the solution can be determined by application of linear programming techniques. At the same time a correction involving the non-linear function $\epsilon(z_k,u_k)$ is included.

It is assumed that the following variables are directly measured: longitudinal acceleration, $a_x$, lateral acceleration, $a_y$, yaw rate, $\Omega$, and front steering angle, $\delta_f$. The following variables are estimated: tire longitudinal forces $F_{xLF}$, $F_{xRF}$, $F_{xLR}$, $F_{xRR}$ (can be estimated from the brake system model and wheel rotary dynamics), vehicle longitudinal velocity, $v_x$, (estimated from measured wheel speeds) and lateral velocity, $v_y$ (methods of estimation are known to those skilled in art and used in electronic stability control systems). In addition, estimates of surface coefficient of adhesion, $\mu$, can be used if available.

This description covers the application of a reconfigurable control algorithm to vehicles equipped with steer by wire or both steer and brake by wire. Vehicles with brake by wire only have one less control input (steering angle). This can be handled by placing very high actuator use penalty on the steering actuator, thus forcing this control input to be zero.

Figure 3:
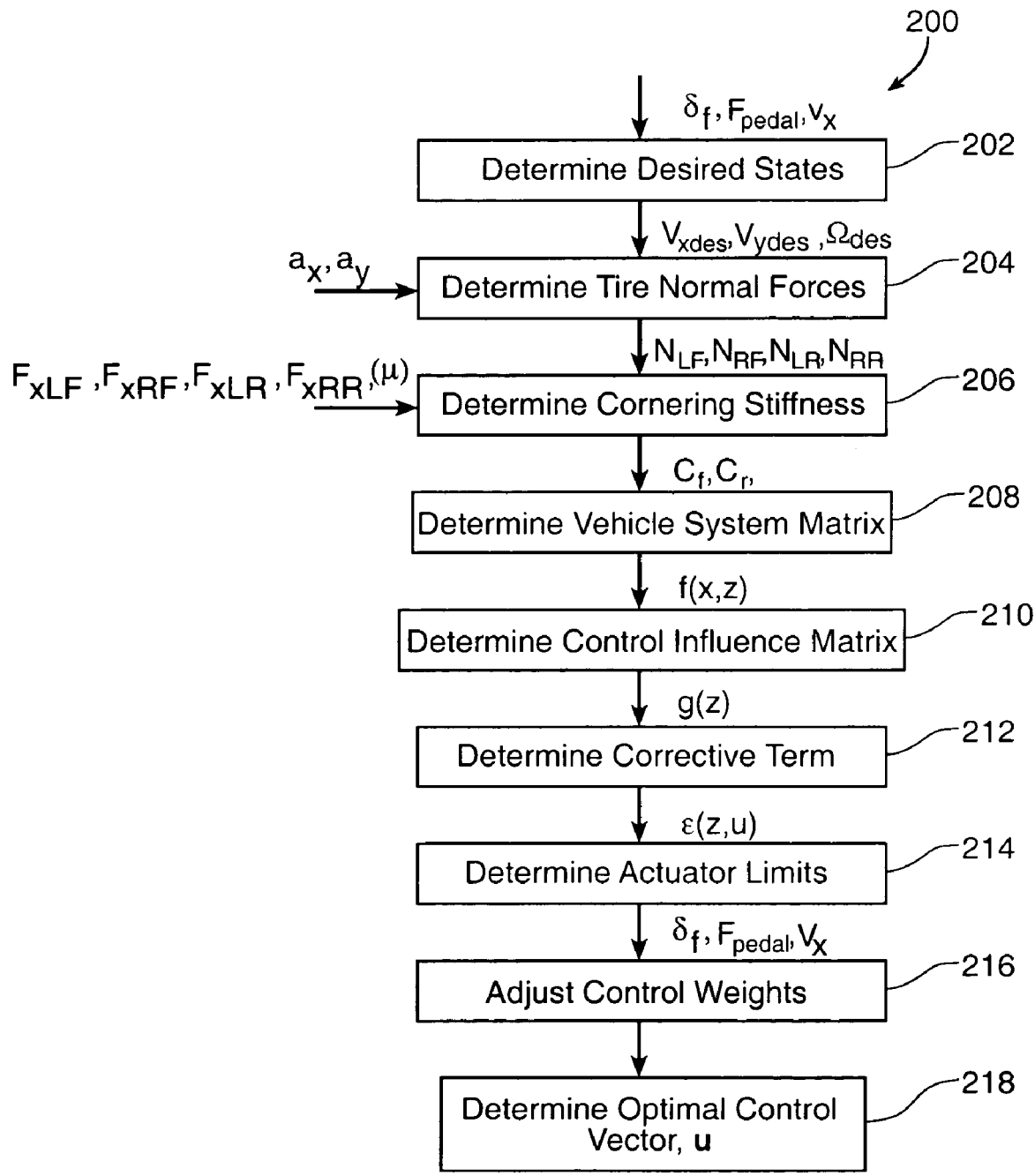
FIG. 3 is an algorithm flow diagram of a procedure performed by the vehicle brake system of FIG. 2.
Figure 4A:
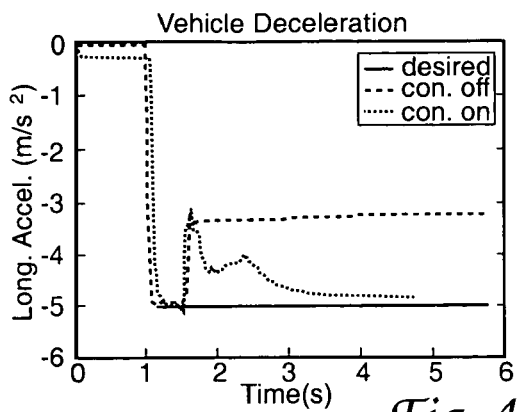
FIGS. 4A-4D are graphical plots of desired braking of a brake pedal applied to a brake-by-wire (BBW) system after 1.0 seconds with a desired deceleration of 0.5 g, initial travel at 20 m/s on a dry surface and a front left brake failure at 1.5 seconds.
Figure 4B:
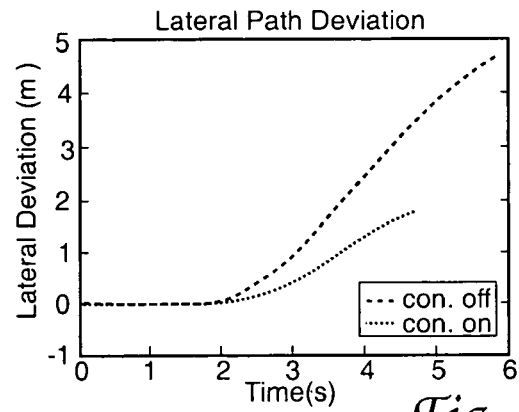
Figure 4C:
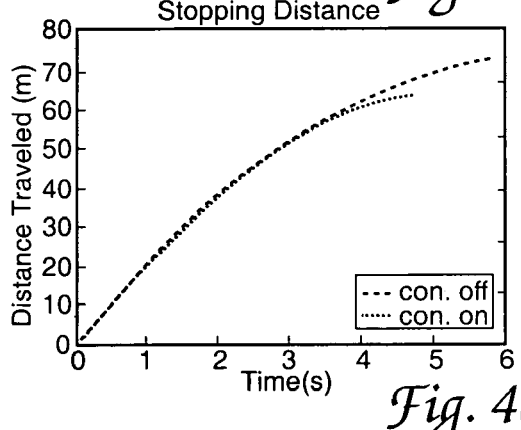
Figure 4D:
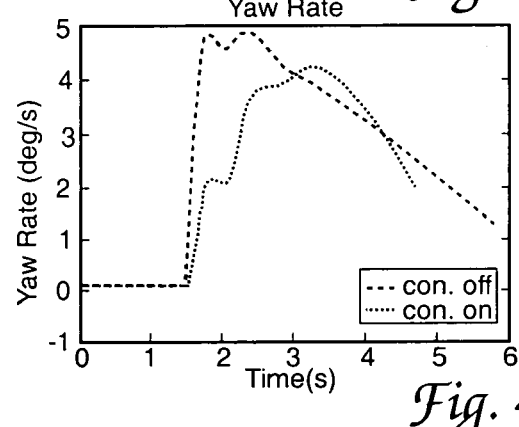
Figure 5A:
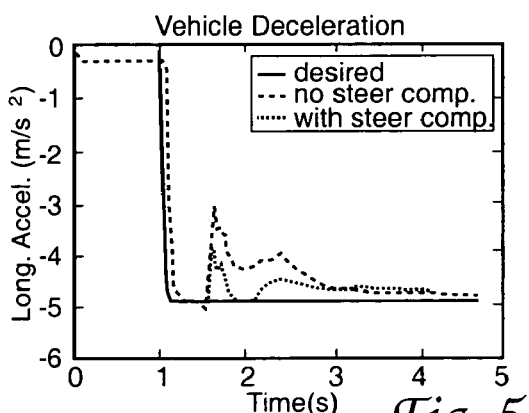
FIGS. 5A-5D are graphical plots of desired braking of a brake pedal applied to a brake-by-wire (BBW) system compared to a steer-by-wire (SBW) system each having the benefit of the reconfigurable control algorithm after 1.0 second with a desired deceleration of 0.5 g, initial travel at 20 m/s on dry surface and a front left brake failure at 1.5 seconds.
Figure 5B:
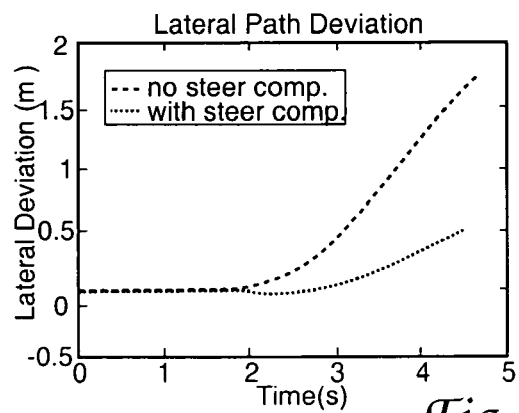
Figure 5C:
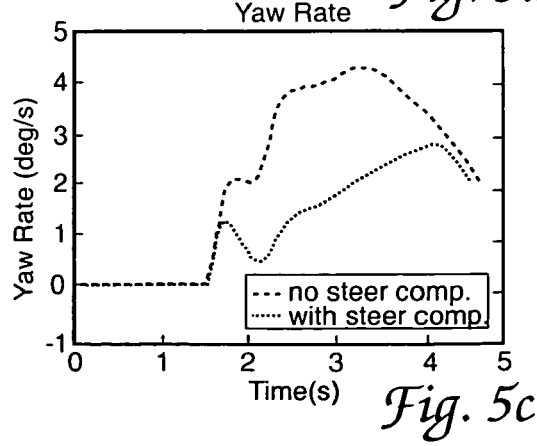
Figure 5D:
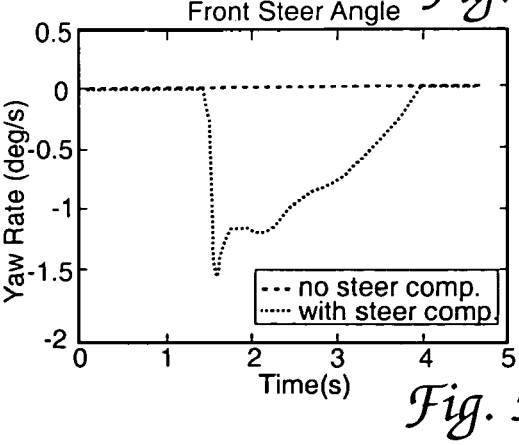

In FIG. 3, a sequence of operations 200 is depicted, beginning with a determination of desired states (block 202). In this step the desired values of state variables describing vehicle motion in the yaw plane are calculated. These states are: longitudinal and lateral velocities of the vehicle center of mass, $v_{xdes}$, $v_{ydes}$ and vehicle yaw rate, $\Omega_{des}$. These three variables form the 3-dimensional desired state vector, $x_{des}$. Since, as indicated by equation (2), time derivatives of the state vector are also used in determining the optimal control input, derivatives of all three variables are also determined.

Determination of desired lateral velocity and yaw rate has been used for some time by brake-based electronic stability control (ESC) systems and is known to those skilled in art. For example, a U.S. Pat. No. 5,931,887 "Brake Control Method Based on Linear Transfer Function Reference Model", hereby incorporated by reference in its entirety and assigned to Delphi Corporation, describes several ways of accomplishing this. One possible way is to first determine the desired steady-state values of lateral velocity and yaw rate as functions of vehicle speed and steering angle from look-up tables, then pass them through filters with speed-dependent parameters reflecting vehicle yaw dynamics. The look-up tables can be determined by measuring the steady-state values on dry surface. As a result, the desired values $v_{ydes}$ and $\Omega_{des}$ are obtained. Their derivatives, $v_{ydesdot}$ and $\Omega_{desdot}$, can be determined by passing these signals through the high-pass filters, which approximate derivatives. An example of such filter is that with a transfer function of $s/(0.02s+1)$ where s is a Laplace operand.

In the process of determining the desired longitudinal velocity, $v_{xdes}$ and its derivative, $v_{xdesdot}$, the desired longitudinal acceleration is first determined. The desired longitudinal acceleration is a function of measured brake pedal force. The unlimited value is first computed as:

$$a_{xdes1} = -K*F_{pedal} \qquad \text{Eqn. 3}$$

where K is a constant of proportionality (for example 0.05 (m/s$^2$)/N and $F_{pedal}$ is the brake pedal force. In our sign convention brake pedal force is positive and deceleration is negative. The desired value is then limited to reasonable value, that is $$a_{xdes2} = \begin{cases} 0 & \text{when } a_{xdes1} > 0 \\ a_{xdes1} & \text{when } -a_{xmax} \leq a_{xdes1} \leq 0 \\ -a_{xmax} & \text{when } a_{xdes1} < -a_{xmax} \end{cases} \qquad \text{Eqn. 4}$$

where $a_{xmax}$ is a constant value selected to be slightly above maximum deceleration that the vehicle can develop on dry surface, for example $-a_{xmax}=10$ m/s$^2$. The desired acceleration, $a_{xdes}$, is then obtained by passing $a_{xdes2}$ through a low-pass filter approximating brake system dynamics, for example, a filter with a transfer function 20/(s+20). The time derivative of the longitudinal velocity, $v_{xdesdot}$ is calculated as follows:

$$v_{xdesdot} = a_{xdes} + v_{ydes}*\Omega_{des} \qquad \text{Eqn. 5}$$

The desired longitudinal velocity, $v_{xdes}$, is then calculated as an integral of the derivative. In discrete time domain it corresponds to $$v_{xdes}(k) = v_{xdes}(k-1) + v_{xdesdot}*\Delta t \qquad \text{Eqn. 6}$$

Here "k" denotes discrete time (that is time, $t=k*\Delta t$) and $\Delta t$ is the sampling time. The initial condition for $v_{xdes}$ is the estimated vehicle longitudinal speed at the onset of braking.

As a result, the desired state vector and its derivative are obtained.

$$x_{des} = \begin{bmatrix} v_{xdes} \\ v_{ydes} \\ \Omega_{des} \end{bmatrix}, \quad dx_{des}/dt = \begin{bmatrix} v_{xdesdot} \\ v_{ydesdot} \\ \Omega_{desdot} \end{bmatrix} \qquad \text{Eqn. 7}$$

After a determination of desired states, a determination of tire normal forces is performed (block 204). In this step tire normal forces for each wheel are calculated using measured longitudinal and lateral accelerations of vehicle, $a_x$ and $a_y$ and known vehicle parameters. Specifically, the normal tire forces are calculated from the following equations:

$$N_{LF} = 0.5*(M*b/L)*g - 0.5*(M*h/L)*a_x + \kappa_f*(M*h/t_w)*a_y \qquad \text{Eqn. 8a}$$
$$= N_{fst} + \Delta N(a_x) + \Delta N_f(a_y)$$

$$N_{RF} = 0.5*(M*b/L)*g - 0.5*(M*h/L)*a_x - \kappa_f*(M*h/t_w)*a_y \qquad \text{Eqn. 8b}$$
$$= N_{fst} + \Delta N(a_x) - \Delta N_f(a_y)$$

$$N_{LR} = 0.5*(M*a/L)*g + 0.5*(M*h/L)*a_x + \kappa_r*(M*h/t_w)*a_y \qquad \text{Eqn. 8c}$$
$$= N_{rst} - \Delta N(a_x) + \Delta N_f(a_y)$$

$$N_{RR} = 0.5*(M*a/L)*g + 0.5*(M*h/L)*a_x - \kappa_r*(M*h/t_w)*a_y \qquad \text{Eqn. 8d}$$
$$= N_{rst} - \Delta N(a_x) - \Delta N_f(a_y)$$

In the above equations, "M" denotes vehicle mass, "L" vehicle wheelbase, "a" and "b" are the distances of vehicle center of gravity to the front and rear axles, respectively, "h" is the height of vehicle center of gravity above ground, "$t_w$" is the track width, "$a_x$" and "$a_y$" are measured longitudinal and lateral accelerations of vehicle. Symbols "$\kappa_f$" and "$\kappa_r$" denote the fraction of the total roll stiffness of suspension contributed by the front and rear suspension, respectively, with $\kappa_f + \kappa_r = 1$. For each tire the normal load is the sum of the static load (front, $N_{fst}$, or rear, $N_{rst}$), normal load transfer due to braking, $\Delta N(a_x)$, and normal load transfer due to cornering, $\Delta N_f(a_y)$ and $\Delta N_r(a_y)$. It is seen that the normal tire load depends on the known vehicle parameters and directly measured longitudinal and lateral accelerations. Acceleration due to braking (e.g. deceleration) is assumed negative and lateral acceleration is positive in a right turn.

Then a determination is made of tire and axle cornering stiffness values (block 206). The cornering stiffness values are the functions of tire normal loads and braking forces. The surface friction also affects cornering stiffness. Thus, if the surface coefficient of friction, "$\mu$", is estimated, it may be used in determining the cornering stiffness values. If it is not available, a value of 1 should be used.

The cornering stiffness values for each tire (LF—left front etc.) are calculated as follows, $$C_{yLF} = C_{y0} * (N_{LF}/N_0) * [1 - k*(N_{LF}-N_0)/N_0] * [1 - F_{xLF}^2/(\mu * N_{LF})^2]$$ Eqn. 9a $$C_{yRF} = C_{y0} * (N_{RF}/N_0) * [1 - k*(N_{RF}-N_0)/N_0] * [1 - F_{xRF}^2/(\mu * N_{RF})^2]$$ Eqn. 9b $$C_{yLR} = C_{y0} * (N_{LR}/N_0) * [1 - k*(N_{LR}-N_0)/N_0] * [1 - F_{xLR}^2/(\mu * N_{LR})^2]$$ Eqn. 9c $$C_{yRR} = C_{y0} * (N_{RR}/N_0) * [1 - k*(N_{RR}-N_0)/N_0] * [1 - F_{xRR}^2/(\mu * N_{RR})^2]$$ Eqn. 9d In the above, $C_{y0}$ denotes tire cornering stiffness at nominal normal load, $N_0$, (which is usually close to the static load), $N_{LF}$ etc. is the normal load calculated in step 2, and k is the tire stiffness sensitivity coefficient to normal load. Parameters $C_{y0}$, $N_0$, k may be different for front and rear tires. The above model is perhaps the simplest tire model reflecting the effects of normal load transfer and braking on tire lateral forces. It reflects the most important effects of braking on steerability. For example, during light braking, the lateral stiffness of front tires increases almost in proportion to normal load, improving steerability. During heavy braking, however, steerability is generally reduced, which is captured by the term $[1-F_{xLF}^1/(\mu * N_{LF})^2]$, which decreases rapidly as braking force, $F_{xLF}$, approaches the normal force $N_{LF}$ times $\mu$ (e.g. the limit of adhesion).

Cornering stiffness values of front and rear axles are then calculated. Each one of them is the sum of cornering stiffness values of both tires of the same axle. Specifically, $$C_f = C_{yLF} + C_{yRF}$$ Eqn. 10a $$C_r = C_{yLR} + C_{yRR}$$ Eqn. 10b Since the tire normal loads depend on directly measured longitudinal and lateral accelerations of the vehicle, the cornering stiffness values per axle are functions of these accelerations, tire longitudinal forces, and estimated coefficient of friction (if available):

$$C_f = C_f(a_x, a_y, F_{xij}, \mu), \quad C_r = C_r(a_x, a_y, F_{xij}, \mu)$$ Eqn. 11

The variables $a_x$, $a_y$, and $F_{xij}$ are directly measured and $\mu$ is estimated (if available).

Then a calculation of vehicle system matrix function f(x,z) is made (block 208).

The vehicle system matrix, f(x,z), is computed as follows:

$$f(x,z) = \begin{bmatrix} v_y \Omega - C_d v_x^2/M - \\ [(C_f + C_r)/(Mv_x)]v_y - [v_x + (C_f a - C_r b)/(Mv_x)]\Omega - \\ [(C_f a - C_r b)/(I_{zz} v_x)]v_y - [(C_f a^2 + C_r b^2)/(I_{zz} v_x)]\Omega \end{bmatrix}$$ Eqn. 12

In the above equation $C_d = C_x * \rho A/2$ is a constant describing the air drag force as a function of speed; here $C_x$ is the drag coefficient, $\rho$ is air density, and A is the frontal area of vehicle ($\rho * v_x^2$ is the dynamic pressure of air). Symbols $C_f$ and $C_r$ are the cornering stiffness values for front and rear axles, determined in step 3. They are functions of directly measured variables and possibly the estimated surface coefficient of adhesion. M is the total mass of vehicle, $I_{zz}$ is the moment of inertia about the yaw (vertical) axis, a and b are the distances of vehicle center of mass to the front and rear axle, respectively.

Then a calculation of control influence matrix g(z) is made (block 210).

The control influence matrix is calculated from the following equation.

$$g(z) = \begin{bmatrix} -1/M & -1/M & -1/M & -1/M & 0 \\ 0 & 0 & 0 & 0 & (C_f - F_{xLF} - F_{xRF})/M \\ -d/I_{zz} & d/I_{zz} & -d/I_{zz} & d/I_{zz} & [a(C_f - F_{xLF} - F_{xRF}) - (M_f h |a_y| a_{yf})/g]/I_{zz} \end{bmatrix}$$ Eqn. 13

Here $d = t_w/2$ is the half track width of the vehicle, $M_f = M*b/L$ is the mass of vehicle associated with the front axle (L=a+b is the wheelbase), g is acceleration of gravity, $a_{yf} = a_y + a*d\Omega/dt$ is the lateral acceleration at the front axle location of the vehicle; which can be determined from measured lateral acceleration (at the vehicle center of mass), $a_y$, and yaw rate, $\Omega$.

Then a calculation of the corrective term $\epsilon(z,u)$ is made (block 212).

The corrective term, $\epsilon(z,u)$ is determined as follows:

$$\varepsilon(z, u) = \begin{bmatrix} -M_f a_{yf} \delta_f / M \\ 0 \\ 0 \end{bmatrix}$$ Eqn. 14

The symbol $\delta_f$ is the front steering angle; other symbols were explained earlier.

Then a determination of the actuator limits is made (block 214). At this step the limits on control inputs primarily due to actuator limits are determined. The control inputs are brake forces at all four corners and the front steering angle. The limits on the magnitudes of brake forces are $$0 \leq F_{xLF} \leq \mu * N_{LF}, \; 0 \leq F_{xRF} \leq \mu * N_{RF}, \; 0 \leq F_{xLR} \leq \mu * N_{LR}, \; 0 \leq F_{xRR} \leq \mu * N_{RR}$$ Eqn. 15

Here $N_{LF}$, $N_{RF}$, $N_{LR}$, and $N_{RR}$ denote the tire normal forces, determined in step 2 and $\mu$ is the estimated coefficient of adhesion. According to equations (8) the normal forces depend on the directly measured longitudinal and lateral accelerations. The limits on the rate of change of tire longitudinal forces depend on the quickness of response of the brake system. Here they were assumed to be constants of 80 kN/z for each wheel.

The steering angle of the front wheels, $\delta_f$, has a hard limitation, usually about 30 degrees (0.52 radians) in each direction. However, for the purpose of control correction, the magnitude of steering angle has a speed-dependent limitation, in order to avoid excessive steering input at high speeds, which may destabilize the vehicle. The limitation used here is as follows:

$$-\text{Min}[\delta_{max}, 15*(L/v_x^2+K_{u0})] \leq \delta_f \leq \text{Min}[\delta_{max}, 15*(L/v_x^2+K_{u0})] \quad \text{Eqn. 16}$$

Here $\delta_{max}$ is the maximum steering angle (about 0.5 radians, applied only at low speeds), L is vehicle wheelbase and $K_{u0}$ is a selected understeer coefficient, which is larger than the understeer coefficient of the vehicle in the linear range of handling. This limitation ensures that the steering angle is sufficient to achieve the maximum lateral acceleration of the vehicle at any speed, but not much larger than that. The rate of change of the front steering angle is limited to a constant value, for example, 1.2 rad/s in each direction.

Then an adjustment of the control weights is made (block 216). In this step, the weights assigning importance to control of each state variable are determined. The controlled states are: longitudinal velocity, lateral velocity and yaw rate. When all of them were expressed in the SI units (velocities in m/s and yaw rate in radians/s), good performance was obtained for the weights of 1, 0.2 and 35 associated with longitudinal velocity, lateral velocity and yaw rate. These weights can be adjusted adaptively, depending on particular conditions. For example, during light braking relative weight on longitudinal acceleration can be reduced, but increased during heavy braking.

Then a determination of the optimal control input is made (block 218). At this step the optimal control input is determined using the control allocation algorithm relying on linear programming.

For the purpose of illustration, simulated vehicle performance during failure of left front brake actuator is shown in FIGS. 4A-D and 5A-D. The vehicle was initially traveling at 20 m/s on a dry surface and the driver applied brakes at 1 second with the desired deceleration of about 0.5 g. Brake failure occurred at 1.5 seconds. No driver correction was assumed. In FIGS. 4A-D performance of vehicle with brake by wire system only (no steer by wire) is shown for vehicles without and with the reconfigurable control algorithm. The vehicle with reconfigurable control experiences larger deceleration and shorter stopping distance, but also lower yaw rate and its rate of change, especially in the first second after failure. As a result, lateral deviation of vehicle from the desired path is much smaller.

In FIGS. 5A-D, graphical depictions are given of performances of a vehicle with brake by wire only compared to those of a vehicle with both brake and steer by wire under the same driving scenario. The vehicle with steer by wire automatically performs a steering correction, which allows it to further reduce vehicle yaw rate and reduce stopping distance.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

What is claimed:

1. A method of selectively inhibiting wheel rotation and lateral displacement of a vehicle during brake or steer failure, the vehicle having axles, tires coupled to the axles, a brake system including a brake pedal to control brake actuators to brake the tires, and a steer system coupled to the axles including a steering wheel to control steering actuators, comprising:
   determining desired values of state variables describing the vehicle motion in a yaw plane using driver steering and brake inputs;
   determining tire normal forces of the vehicle;
   determining values of tire and axle cornering stiffness;
   calculating a vehicle system matrix function;
   calculating a control influence matrix;
   calculating a corrective term;
   sensing a non-operating actuator;
   determining actuator limits for each actuator including setting upper and lower position limits of the non-operating actuator to the failure position;
   performing dynamic inversion by subtracting the vehicle system matrix function and the corrective term from the determined desired values of state variables to determine a solution at a particular time;
   using the determined solution to find a vector of control inputs such that the control influence matrix times the vector of control inputs is equal to the determined solution of the dynamic inversion step; and
   controlling the speed and direction of the vehicle by optimally controlling the remaining operating actuators using the vector of control inputs.

2. The method of claim 1, wherein determining desired values of state variables describing vehicle motion in the yaw plane further comprises:
   determining desired longitudinal acceleration based upon sensed brake pedal position;
   referencing vehicle speed and steering angle in a look-up table to locate empirically derived lateral velocity and yaw rate; and
   high pass filtering a sequence of the lateral velocity and a sequence of the yaw rate to approximate respective lateral and yaw acceleration values.

3. The method of claim 1, wherein determining tire normal forces comprises calculating a normal tire force for each wheel by solving four equations $$N_{LF} = 0.5^*(M^*b/L)^*g - 0.5^*(M^*h/L)^*a_x + \kappa_f^*(M^*h/t_w)^*a_y$$
$$= N_{fst} + \Delta N(a_x) + \Delta N_f(a_y)$$

$$N_{RF} = 0.5^*(M^*b/L)^*g - 0.5^*(M^*h/L)^*a_x - \kappa_f^*(M^*h/t_w)^*a_y$$
$$= N_{fst} + \Delta N(a_x) - \Delta N_f(a_y)$$

$$N_{LR} = 0.5^*(M^*a/L)^*g + 0.5^*(M^*h/L)^*a_x + \kappa_r^*(M^*h/t_w)^*a_y$$
$$= N_{rst} - \Delta N(a_x) + \Delta N_r(a_y)$$

$$N_{RR} = 0.5^*(M^*a/L)^*g + 0.5^*(M^*h/L)^*a_x - \kappa_r^*(M^*h/t_w)^*a_y$$
$$= N_{rst} - \Delta N(a_x) - \Delta N_r(a_y)$$

wherein "M" is vehicle mass, "L" is vehicle wheelbase, "a" and "b" are distances of vehicle center of gravity to front and rear axles, respectively, "h" is height of vehicle center of gravity above ground, "$t_w$" is track width between right and left wheels, "$a_x$" and "$a_y$" are measured longitudinal and lateral accelerations of vehicle, "$\kappa_f$" and "$\kappa_r$" are fractions of a total roll stiffness of suspension contributed by a front and rear suspension, respectively, with $\kappa_f + \kappa_r = 1$, such that for each tire normal load is a sum of a static load (front, $N_{fst}$, or rear, $N_{rst}$), normal load transfer due to braking, $\Delta N(a_x)$, and normal load transfer due to cornering, $\Delta N_f(a_y)$ and $\Delta N_r(a_y)$.

4. The method of claim 1, wherein determining the values of tire and axle cornering stiffness comprises estimating a surface coefficient of friction "$\mu$" and calculating cornering stiffness values based upon tire normal loads and braking forces by solving by solving two equations for cornering stiffness values of front and rear axles as a sum of a contribution from a pair of tires for the respective axle:

$$C_f = C_{yLF} + C_{yRF}$$

$$C_r = C_{yLR} + C_{yRR}$$

which in turn are calculated by solving four equations:

$$C_{yLF} = C_{y0}^*(N_{LF}/N_0)^*[1 - k^*(N_{LF} - N_0)/N_0]^*[1 - F_{xLF}^2/(\mu^*N_{LF})^2]$$

$$C_{yRF} = C_{y0}^*(N_{RF}/N_0)^*[1 - k^*(N_{RF} - N_0)/N_0]^*[1 - F_{xRF}^2/(\mu^*N_{RF})^2]$$

$$C_{yLR} = C_{y0}^*(N_{LR}/N_0)^*[1 - k^*(N_{LR} - N_0)/N_0]^*[1 - F_{xLR}^2/(\mu^*N_{LR})^2]$$

$$C_{yRR} = C_{y0}^*(N_{RR}/N_0)^*[1 - k^*(N_{RR} - N_0)/N_0]^*[1 - F_{xRR}^2/(\mu^*N_{RR})^2]$$

wherein $C_{y0}$ is tire cornering stiffness at nominal normal load, $N_0$, is approximately a static load, $N_{LF}$ etc. is a calculated normal load, and "k" is a tire stiffness sensitivity coefficient to normal load wherein parameters $C_{y0}$, $N_0$, k may differ for front and rear tires.

5. The method of claim 1, wherein the vehicle system matrix function, f(x,z), is computed as follows:

$$f(x,z) = \begin{bmatrix} v_y \Omega - C_d v_x^2/M - \\ [(C_f + C_r)/(Mv_x)]v_y - [v_x + (C_f a - C_r b)/(Mv_x)]\Omega - \\ [(C_f a - C_r b)/(I_{zz} v_x)]v_y - [(C_f a^2 + C_r b^2)/(I_{zz} v_x)]\Omega \end{bmatrix}$$

wherein $C_d = C_x^* \rho A/2$ is a constant describing the air drag force as a function of speed with $C_x$ as drag coefficient, $\rho$ as air density, and A as the frontal area of vehicle, $\rho^* v_x^2$ as the dynamic pressure of air, $C_f$ and $C_r$ are the cornering stiffness values for front and rear axles, M is a total mass of vehicle, $I_{zz}$ is a moment of inertia about a yaw (vertical) axis, and a and b are distances of vehicle center of mass to the front and rear axle, respectively.

6. The method of claim 5, wherein calculating the control influence matrix comprises solving an equation:

$$g(z) = \begin{bmatrix} -1/M & -1/M & -1/M & -1/M & 0 \\ 0 & 0 & 0 & 0 & (C_f - F_{xLF} - F_{xRF})/M \\ -d/I_{zz} & d/I_{zz} & -d/I_{zz} & d/I_{zz} & [a(C_f - F_{xLF} - F_{xRF}) - (M_f h|a_y|a_{yf})/g]/I_{zz} \end{bmatrix}$$

wherein $d = t_w/2$ is a half track width of a vehicle, $M_f = M^*b/L$ is a mass of the vehicle associated with a front axle, "a" and "b" are distances of vehicle center of gravity to front and rear axles with L=a+b as a wheelbase measurement, "g" is acceleration of gravity, $a_{yf} = a_y + a^* d\Omega/dt$ is a lateral acceleration at the front axle of the vehicle.

7. The method of claim 6, wherein calculating the corrective term comprises sensing a front steering angle "$\delta_f$" and solving an equation where the corrective term $\epsilon(z,u)$ is determined by $$\varepsilon(z, u) = \begin{bmatrix} -M_f a_{yf} \delta_f / M \\ 0 \\ 0 \end{bmatrix}.$$

8. The method of claim 1, wherein determining actuator limits comprises limiting brake forces at each of four corners right front (RF), left front (LF), right rear (RR) and left rear (LR) with limits imposed by respective equations:

$$0 \leq F_{xLF} \leq \mu^* N_{LF}, \ 0 \leq F_{xRF} \leq \mu^* N_{RF}, \ 0 \leq F_{xLR} \leq \mu^* N_{LR},$$
$$0 \leq F_{xRR} \leq \mu^* N_{RR},$$

wherein $N_{LF}$, $N_{RF}$, $N_{LR}$, and $N_{RR}$ are tire normal forces and "$\mu$" is an estimated coefficient of adhesion.

9. The method of claim 8, wherein determining actuator limits further comprises limiting a steering angle command to a maximum steering angle "$\delta_{max}$" defined by physical rotation limits of front tires and further comprises of a speed-dependent limitation to avoid destabilizing steering input at high speeds by solving an equation:

$$-\text{Min}[\delta_{max}, 15^*(L/v_x^2 + K_{u0})] \leq \delta_f \leq \text{Min}[\delta_{max}, 15^*(L/v_x^2 + K_{u0})]$$

wherein "L" is vehicle wheelbase and "$K_{u0}$" is a selected understeer coefficient that is larger than an understeer coefficient of a linear range of handling.

10. The method of claim 1, wherein determining optimum control inputs further comprises adjusting control weights.

11. The method of claim 7, wherein the performing dynamic inversion step and the using the determined solution step are calculated according to an equation $$[dx_{des}/dt - f(x_k, z_k) - \epsilon(z_k, u_k)] = g(z_k) u_{k+1}$$

where $u_{k+1}$ is the vector of control inputs.

* * * * *